United States Patent [19]

Oskarsson et al.

[11] Patent Number: 4,575,001
[45] Date of Patent: Mar. 11, 1986

[54] HEAT PUMP SYSTEM

[75] Inventors: Sven G. Oskarsson, Hudson; Salvatore Santangelo, Laval, both of Canada

[73] Assignee: Cantherm Heating Ltd., Ville St. Laurent, Canada

[21] Appl. No.: 738,903

[22] Filed: May 29, 1985

Related U.S. Application Data

[63] Continuation of Ser. No. 563,967, Dec. 21, 1983, abandoned.

[30] Foreign Application Priority Data

Oct. 11, 1983 [CA] Canada ................................ 438366

[51] Int. Cl.$^4$ .......................................... G05D 23/00
[52] U.S. Cl. ................... 237/2 B; 62/238.6; 237/19
[58] Field of Search ............... 62/238.6, 324.1, 324.6, 62/510; 237/2 B, 19; 165/29

[56] References Cited

U.S. PATENT DOCUMENTS 4,308,723  1/1982  Ecker .................................. 62/324.6
4,375,831  3/1983  Downing, Jr. ..................... 237/2 B

FOREIGN PATENT DOCUMENTS 2637209  2/1978  Fed. Rep. of Germany ..... 62/238.6

Primary Examiner—Henry Bennett

[57] ABSTRACT

A heat pump system for a building provides space heating or cooling, together with a supply of hot water available in both the heating and cooling seasons or when the building space is neither heated nor cooled. The system is also versatile in that it can be readily accommodated to new construction (forced air systems) or to the retrofitting of existing buildings, the majority of which are fitted with convection type hot water radiators. These results are achieved by a refrigerant circuit that includes three heat exchangers (12, 15, 16), one (12) linked to a heat source (10), one (15) to a forced air system including a blower (17) and the third (16) to a hot water circuit (40-49) that supplies heat to the radiators (47) and to a hot water tank (41). A reversing valve (13) in the refrigerant circuit and a two way valve (42) in the hot water circuit enable selection of one of several operating modes, i.e. space heating only, space cooling only, hot water heating only, or one or more combinations of these requirements. The valve (42) in the hot water system can give priority to the hot water tank (41) over the radiators (47).

8 Claims, 1 Drawing Figure

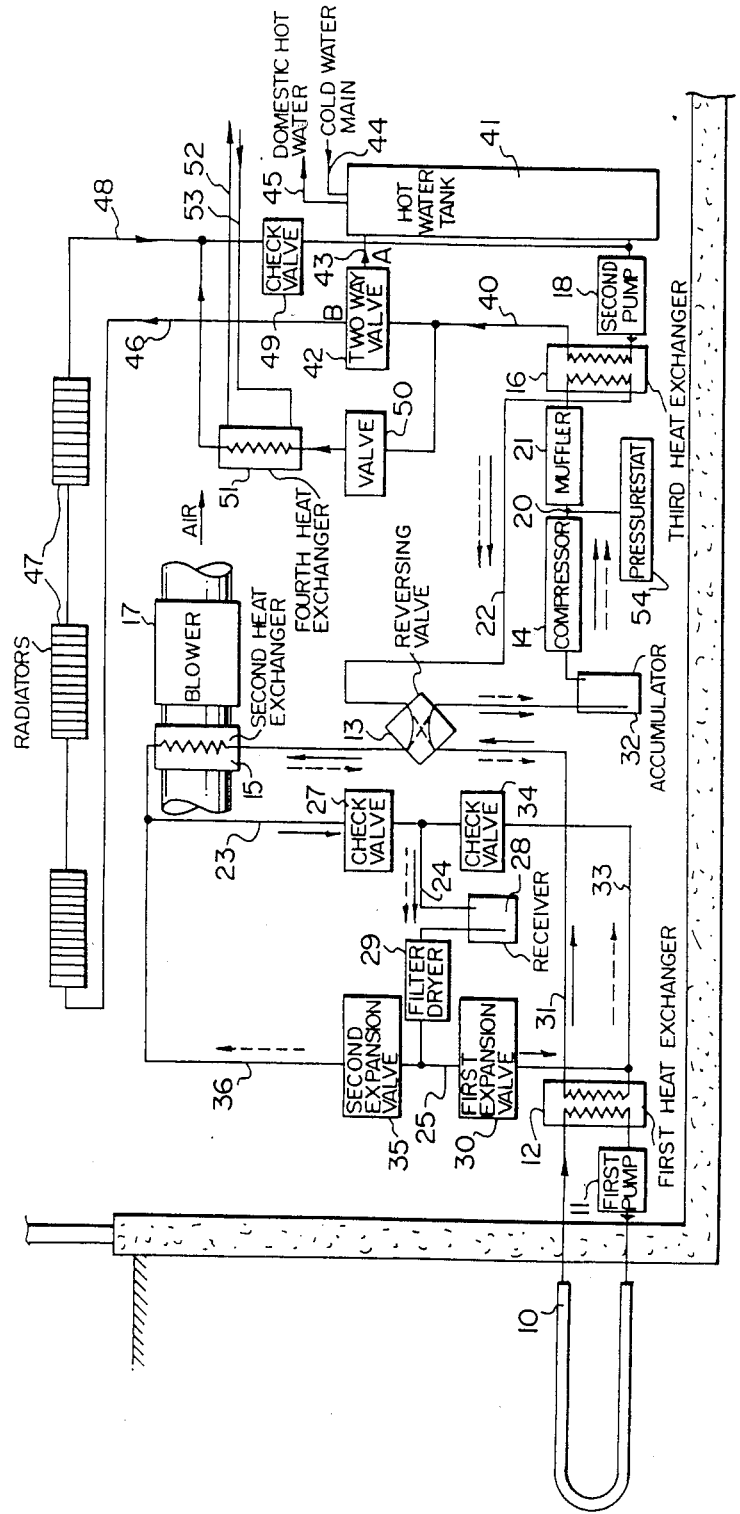

HEAT PUMP SYSTEM

This application is a continuation, of application Ser. No. 563,967, filed Dec. 21, 1983 now abandoned.

BACKGROUND OF THE INVENTION

This invention relates to a heat pump system for use in the heating and/or cooling of homes, apartments and other buildings, such as industrial plants and complexes (whether public or private) in which people live or work. More specifically, the invention is concerned with buildings that require both heating or cooling of the air space within the building, as well as the further heating of a body of water, principally the provision of a hot water supply for normal bathroom, kitchen and utility room use. In addition some systems may provide for the heating of additional water, such as that of a swimming pool, hot tube etc.

PRIOR ART

The principle of a heat pump system is well known. Firstly, it is necessary to select a heat source external to the building. This may be the air, although a ground source is preferred, since it remains warmer during severe winter conditions. A "ground" source may take the form of pipes buried in the ground (a closed loop) or may in fact be water, e.g. water in a well or an adjacent lake or river. In the majority of cases, the buried pipe system is the one preferred from the thermodynamic point of view, although its initial capital cost may be higher than some other systems, e.g. a system using an air source.

In a conventional heat pump system, a first heat exchanger provides a thermal linkage between the heat source, e.g. anti-freeze circulated in the buried pipes, and a refrigerant circuit. The refrigerant is compressed and circulated to a second heat exchanger which provides thermal linkage with the air in the building. In the heating mode, this second heat exchanger acts as a condensor, while the first heat exchanger becomes the evaporator. In the cooling mode, these functions are interchanged, the direction of travel of the refrigerant being reversed.

A system employing three heat exchangers has been disclosed in A. L. Ecker U.S. Pat. No. 4,308,723 issued Jan. 5, 1982.

SUMMARY OF THE INVENTION

The present invention provides a system that, while adopting the foregoing basic manner of operation, provides significant improvements therein. In particular, it provides improvements in the flexibility of the system and its practical adaptability.

An objective of the present invention is to provide a heat pump system that has increased versatility in terms of its applicability either to new construction or to the retrofitting of existing structures. The majority of heating systems already installed in domestic dwellings and larger structures, such as office buildings, both in Canada and the northern parts of the United States as well as in many other countries, are hydronic systems, i.e. the final transfer of heat to the space within the building takes places from hot water flowing in convectors i.e. pipes fitted with external fins, commonly referred to as radiators. In new construction, forced air systems are more common. In this latter type of system, the air in the building is circulated by a blower, the heat being transferred directly to the air, either from a furnace, or, in the case of a heat pump installation, by the second heat exchanger referred to above.

The temperatures required by hydronic and forced air systems are different, it being necessary to maintain the temperature of the water in the radiators of a hydronic system substantially higher than that of the air in a forced air system. Also the area of the radiating surfaces of the radiators will likely prove insufficient to maintain the building at the desired temperature.

Another basic difference between hydronic and forced air systems resides in the fact that the forced air system is adaptable for cooling in summer, while under normal circumstances the hydronic system is not.

As stated above, the present invention is designed to provide a system of improved versatility. More specifically, it provides a system that is usable without basic modification to provide a building with both a hydronic and a force air heating system, the forced air part of the system being adaptable for cooling in summer, and the whole system being suitable for either retrofit or new construction. In addition, the invention provides a system that can also furnish the building with a hot water supply and/or the ability to heat a swimming pool, hot tub or other installation that requires heat.

Moreover, the invention provides a system that can maintain a full supply of hot water even when the forced air system is shut down and the building space is subjected neither to heating nor to cooling, an important consideration in spring and autumn.

To this end the invention consists of a method of operating a heat pump system for a building space, said system comprising a refrigerant-charged circuit having a compressor, a reversing mechanism having two positions, two expansion devices, a first heat exchanger thermally linked to a heat source, a second heat exchanger thermally linked to a forced air system for the building space and having a blower, and a third heat exchanger thermally linked to a hot water system; said method comprising operating the system in each of three modes, namely (a) in a space heating mode, carrying out the steps of operating the compressor and the blower and locating the reversing mechanism in a first one of its said positions to cause refrigerant to flow from the compressor serially through the third heat exchanger, the second heat exchanger to transfer heat to the forced air system, the first expansion device, the first heat exchanger to extract heat from the source, and back to the compressor, (b) in a space cooling mode, carrying out the steps of operating the compressor and the blower and locating the reversing mechanism in the second of its said positions to cause refrigerant to flow from the compressor serially through the third heat exchanger, the first heat exchanger, the second expansion device and the second heat exchanger to extract heat from the forced air system and transfer said heat to at least one of the hot water system connected to the third heat exchanger and the source (not acting as a heat sink) connected to the first heat exchanger, back to the compressor, and (c) in a water heating mode, carrying out the steps of operating the compressor while deenergizing the blower and locating the reversing mechanism in its first position to cause refrigerant to flow in vapor phase from the compressor to the third heat exchanger to be condensed therein to transfer heat to the hot water system, and then to flow in liquid phase serially through the second heat exchanger, the first expansion device and the first heat exchanger to extract heat from the source, and back to the compressor, to furnish hot water while the building space is neither heated or cooled.

In the preferred embodiment of the invention, the hot water system includes both a hot water tank and radiators in the building. A two-way valve selectively directs the flow either to the hot water tank or to the radiators. This valve is under the control of a control panel which receives a signal from a thermostat in the tank. Normally, the control panel reacts to this signal to give the tank priority whenever there is a demand for hot water, while ensuring that the flow goes to the radiators when there is no such demand. However, this signal can be ignored by the control panel to ensure that the two-way valve always directs the flow to the hot water tank and never to the radiators. This effect is necessary when the building is not to be heated, or is to be cooled (air conditioned), but hot water is still required. Under these circumstances a pressurestat on the high pressure side of the compressor will sense if no further heat can safely be absorbed by the hot water tank and will then shut down the compressor and the pumps.

In the accompanying drawing, a preferred embodiment of the invention is illustrated by way of example only, the broad scope of the invention being defined in the appended claims.

BRIEF DESCRIPTION OF THE DRAWING

The drawing shows a schematic layout and circuit of a heat pump system and associated parts, such as a heat source and convection radiators in a building in the basement of which the system is assumed to be installed.

DESCRIPTION OF THE PREFERRED EMBODIMENT

The drawing shows a closed loop 10 of tubing (which can extend either vertical or horizontal), which is filled with anti-freeze and buried in the ground. As indicated above, an alternative form of "ground" heat source can be a well or body of water. Indeed, the present invention can be used with an air heat source, although the latter is less preferred in those locations subject to very low winter temperatures, because some form of auxiliary heating, e.g. a furnace, then becomes necessary. The anti-freeze in the loop 10 is circulated by a first pump 11 through a first heat exchanger 12 which is conventional in its construction and serves as an evaporator (in the heating mode) to transfer heat to a refrigerant circuit.

The refrigerant circuit is charged with a suitable refrigerant, e.g. that known as R-22, R-502, R-12 or R114, and consists principally of a reversing valve 13, a compressor 14, a second heat exchanger 15 and a third heat exchanger 16 which acts either as a desuperheater or as a condenser.

The second heat exchanger 15 provides thermal linkage between the refrigerant circuit and air forced over the exchanger by a blower 17.

The third heat exchanger 16 provides thermal linkage between the refrigerant circuit and water circulated by a second pump 18.

In the basic heating mode, refrigerant flows (in vapor phase) as shown by solid arrows from the high pressure side of the compressor 14 through a pipe 20 and a muffler 21 to the third heat exchanger 16 which acts as a condenser and extracts heat. The refrigerant (in liquid phase) then travels along a pipe 22 and through the reversing valve 13 to the second heat exchanger 15 which also acts as a condenser to extract further heat (at a lower temperature) and to transfer such heat to the air forced by the blower 17 to heat the building. Downstream of the heat exchanger 15, the refrigerant (still in liquid phase) passes in pipes 23, 24 and 25 through a check valve 27, i.e. a non-return valve, a receiver 28 and a filter dryer 29 (both conventional components in such a system) to a thermostatically controlled first expansion valve 30 and then to the first heat exchanger 12 which forms the evaporator. From the downstream side of the heat exchanger 12, the refrigerant (in vapour phase) passes in pipe 31 through the reversing valve 13 and an accumulator 32 to the input side of the compressor 14. A pressurestat 54 is connected to the high pressure side of the compressor 14.

In the basic cooling mode, the reversing valve 13 is reversed, so that the pipe 22 is now connected to the pipe 31 and the refrigerant flows as shown by the broken arrows, i.e. after the valve 13 to the first heat exchanger 12 and then in pipe 33 through a check valve 34, the receiver 28 and the filter dryer 29 to a second thermostatically controlled expansion valve 35 and then in pipe 36 to the second heat exchanger 15 which now acts as the evaporator to extract heat from the forced air. The refrigerant returns to the compressor 14 through the reversing valve 13.

As stated above, the third heat exchanger 16 extracts heat from the refrigerant, and this action takes place in both the heating and cooling modes. This heat is transferred to water circulated by the pump 18. This water flows in pipe 40 to the outer jacket of a hot water tank 41 through an automatic, two-way valve 42 and a pipe 43. The type of valve used for this purpose is sometimes referred to as a "three-way valve" because it has three ports, but the term "two-way" has been adopted herein to signify that it serves to divert the water flow in one or other of two ways. The inner compartment of the tank 41 is connected by pipes 44 and 45 to the cold water main and the outflow to the domestic hot water system, respectively. Hence, the tank 41 is, in effect, another heat exchanger providing thermal linkage between the hydronic system and the domestic water supply. Alternatively, a conventional hot water tank interfacing with the hydronic system through a separate heat exchanger can be used.

At the same time the hot water in pipe 40 is connectable by the valve 42 to a further pipe 46 leading to the hydronic space heating system, namely the radiators 47 in the building. Return flow is in pipe 48 through a check valve 49. The two-way valve 42 has positions A and B. Position A connects the pumped water to the tank 41, position B to the radiators 47.

In addition, if desired, the heated water in pipe 40 can be connected through a manually controllable valve 50 to a fourth heat exchanger 51 for transferring the heat to water circulated in pipes 52, 53 by means of pumps (not shown) to one or more further installations (not shown), such as a swimming pool or hot tub.

The overall performance of the system is determined by a control panel (not shown) reacting to the usual thermostats. Such performance is as follows:

During the heating season, the first pump 11, the compressor 14 and the second pump 18 are normally constantly turned on. Three possible requirements then exist: (a) hot water only, (b) space heating only, or (c) both hot water and space heating.

In situation (a) the blower 17 is turned off, the reversing valve is deenergised, i.e. is in its "first" (full line)

position shown in the drawing and the valve 42 is set in its A position. Heat is then pumped from the first heat exchanger 12 to the third heat exchanger 16 and there used to heat the water in the tank 41. The second heat exchanger 15 remains in the refrigerant circuit but represents no significant transfer of heat since the blower 17 is off. If the pressurestat 54 indicates no further demand for heat, it will close down the system.

When the control panel is set for situation (b), the valve 42 is held in position B and the blower 17 is on. The reversing valve remains deenergised. Heat is then pumped from the first heat exchanger 12 to the third heat exchanger 16, where it is removed at relatively high temperature to feed the hydronic heating system, i.e. radiators 47. Heat also flows to the second heat exchanger 15 where it is removed at a lower temperature to supply the forced air system. However, some distribution systems may have only a forced air or only a hydronic system.

When the requirement is for situation (c), the system functions the same as in situation (b), except that the position of the valve 42 is no longer set by the control panel, but is determined by the demand from the hot water tank 41. When there is demand for heat from the tank 41, it will be given priority and the valve 42 will occupy position A. Usually such a demand will be comparatively short lived, e.g. 10–30 minutes, and the building will have sufficient thermal inertia to enable it to accept reduced heating for such a period without serious disadvantage while the tank 41 is being reheated.

At any time during any of these situations, the valve 50 can be opened by manual control to utilise the fourth heat exchanger 51.

During the cooling season, three possible requirements exist: (d) hot water only, (e) air conditioning only, or (f) both hot water and air conditioning.

In situation (d) the control device turns on the pumps 11 and 18 and places the valve 42 in the A position, the conditions and function being the same as in situation (a).

In situation (e) the blower 17 is on, as well as the pump 11, but the pump 18 is off. Also the reversing valve 13 is energised to bring it to its reversed (broken line) condition. The third heat exchanger 16 remains in the refrigerant circuit and extracts some heat at high temperature, which is injected into the hot water tank by self-circulation (convection) even though the pump 18 is off. Overheating of the hot water in the tank is avoided by the self-limiting feature of the convection flow. However, in situation (e) the flow of heat is mainly from the second heat exchanger 15 to the first heat exchanger 12.

In situation (f) the blower 17 is on, as well as the pump 18, but the pump 11 is normally off and the ground source 10 unused. The reversing valve 13 is again energised. Since the first heat exchanger is now effectively unused, the flow of heat is now from the second heat exchanger 15 to the third heat exchanger 16. This means that the heat exchanger 16 is now acting as a full condenser. The valve 42 is, of course, held in position A. On the other hand, if the demand for hot water is low, the control panel receives a signal from the pressurestat 54 and turns on the pump 11 and turns off the pump 18, so that the heat extracted by the heat exchanger 15 is passed to the heat source (heat sink) 10 through the heat exchanger 12. Clearly, situations intermediate these two extremes are also possible.

To summarise, the system can pump heat in basically four different ways:
(i) from heat exchanger 12 to heat exchanger 16 (demand for only hot water),
(ii) from heat exchanger 12 to both heat exchangers 16 and 15 (demand for only space heating, or for space heating and hot water),
(iii) from heat exchanger 15 to heat exchanger 12 (demand for only air conditioning),
(iv) from heat exchanger 15 to heat exchanger 16 or to both heat exchangers 12 and 16 (demand for air conditioning and hot water).

If hydronic heating is not required while forced air heating or cooling is required, valve 42 is always in the A position and the heat exchanger 16 acts as a desuperheater. This means that a small amount of heat at high temperture is injected into the hot water tank by convection, as explained in relation to situation (e) above, and the pump 18 is not required to run. This is an important point, because it both saves energy for running the pump 18 and takes advantage of the very high temperature of the superheated gas at the discharge side of the compressor. This facility depends, however, on using for the heat exchanger 16 one that is vertically oriented and has a low pressure drop from input to output, i.e. a large surface area. Such a heat exchanger has been disclosed in Swedish Patent application No. 8 101 767 5 of Eric Graryd et al filed Mar. 20, 1981 and published Sept. 20, 1982.

In addition to the numerous facets of flexibility demonstrated above, the disclosed heat pump system can be adapted either to a new construction having a forced air system, in which case the hydronic circuit is used only for the hot water supply and any auxiliary equipment, such as a swimming pool; or to the retrofitting of an existing construction already fitted with hot water radiators, in which case it may be necessary to cut some holes in floors and/or walls and install some ducting to accommodate the forced air system.

Although not shown in the drawing, the system will, of course, incorporate the usual practical and safety features, such as high and low limit pressurestats on the high and low pressure sides of the compressor, other thermstatic controls and the necessary valves for filling and bleeding the various parts of the system.

We claim:
1. A method of operating a heat pump system for a building space, said system comprising a refrigerant-charged circuit having a compressor, a reversing mechanism having two positions, two expansion devices, a first heat exchanger thermally linked to a heat source, a second heat exchanger thermally linked to a forced air system for the building space and having a blower, and a third heat exchanger thermally linked to a hot water system; said method comprising operating the system in each of three modes, namely
  (a) in a space heating mode, carrying out the steps of operating the compressor and the blower and locating the reversing mechanism in a first one of its said positions to cause refrigerant to flow from the compressor serially through the third heat exchanger, the second heat exchanger to transfer heat to the forced air system, the first expansion device, the first heat exchanger to extract heat from the source, and back to the compressor,
  (b) in a space cooling mode, carrying out the steps of operating the compressor and the blower and locating the reversing mechanism in the second of its said positions to cause refrigerant to flow from the compressor serially through the third heat exchanger, the first heat exchanger, the second expansion device and the second heat exchanger to extract heat from the forced air system and transfer said heat to at least one of the hot water system connected to the third heat exchanger and the source (now acting as a heat sink) connected to the first heat exchanger, back to the compressor, and (c) in a water heating mode, carrying out the steps of operating the compressor while deenergizing the blower and locating the reversing mechanism in its first position to cause refrigerant to flow in vapor phase from the compressor to the third heat exchanger to be condensed therein to transfer heat to the hot water system, and then to flow in liquid phase serially through the second heat exchanger, the first expansion device and the first heat exchanger to extract heat from the source, and back to the compressor, to furnish hot water while the building space is neither heated nor cooled.

2. A method according to claim 1, including, in the space heating mode, the step of operating pumps respectively thermally linking the first heat exchanger to the source and the third heat exchanger to the hot water system to transfer heat from the source to both the forced air system and the hot water system.

3. A method according to claim 1, including, in the space cooling mode, the step of operating a pump thermally linking the third heat exchanger to the hot water system to transfer heat from the forced air system to the hot water system.

4. A method according to claim 1, including, in the space cooling mode, the step of operating a pump thermally linking the first heat exchanger to the source to transfer heat from the forced air system to the source.

5. A method according to claim 1, including, in the space cooling mode, the step of operating pumps respectively thermally linking the third heat exchanger to the hot water system and the first heat exchanger to the source to transfer heat from the forced air system to both the hot water system and the source.

6. A method according to claim 1, wherein the hot water system includes a hot water tank and space heating radiators in the building and a two-way valve, said method including operating said valve for selectively directing flow between the hot water tank and the radiators.

7. A method according to claim 6, wherein the hot water system also includes a fourth heat exchanger for thermally linking the hot water system to additional equipment requiring heat.

8. A method according to claim 6, wherein the third heat exchanger is vertically oriented and has a low pressure drop, the method comprising the step of operating in a modification of either of said space heating and space cooling modes in which heat at high temperature is injected into the tank by convection flow through the third heat exchanger which now acts as a desuperheater, overheating of the tank being avoided by the self-limiting nature of convection flow.

* * * * *